July 6, 1954   N. J. MERCER ET AL   2,682,950
KITCHEN UTENSIL HOLDER
Filed June 4, 1951

INVENTORS.
NORMAN J. MERCER
HENRY W. ZADIKOFF
BY
ATTORNEY.

Patented July 6, 1954

2,682,950

UNITED STATES PATENT OFFICE 2,682,950

KITCHEN UTENSIL HOLDER

Norman J. Mercer, Brooklyn, N. Y., and Henry W. Zadikoff, Belleville, N. J.

Application June 4, 1951, Serial No. 229,809

2 Claims. (Cl. 206—72)

The present invention relates to a holder and it particularly relates to a holder which may be utilized in the household, either in the kitchen or dining room, for carrying and maintaining in readiness various cutlery to be used in the preparation and serving of foodstuffs.

It is among the objects of the present invention to provide a simple, attractive, readily cleaned, multiple purpose utensil holder which may carry a variation of utensils compactly and in a condition of ready availability in the cooking and serving of foodstuffs and meals.

Another object is to provide a novel, multiple purpose knife and kitchen utensil carrier which will serve for holding and receiving said utensils while not used and at the same time will present them so that they may be readily chosen and used for the purpose of serving meals.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In connection with the above objects, it has been found most satisfactory, according to one embodiment of the present invention, to provide a holder desirably having an upper and lower tier which may be made of wood, such as maple or plastic or even of metal such as aluminum or magnesium, in which there will be a bottom holder structure and top holder structure keyed together. Normally the bottom structure will carry a butcher cleaver, a thin slicer, a bread slicer, a utility knife and paring knife in side-by-side relationship, with means being provided to permit ready removal and grasping of these elements.

An upper, removable tier or lever may carry a carving fork, sharpening steel and roast slicer.

Generally the upper section may be removable as a separate unit and carried into the dining room from the kitchen and used in connection with the slicing and serving of meats and other prepared foodstuffs, while the entire unit may be used either in the kitchen or the dining room.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications may be resorted to which fall within the scope of the claims hereunto appended.

In the drawings wherein like reference characters denote corresponding parts throughout the several views.

Figure 1:
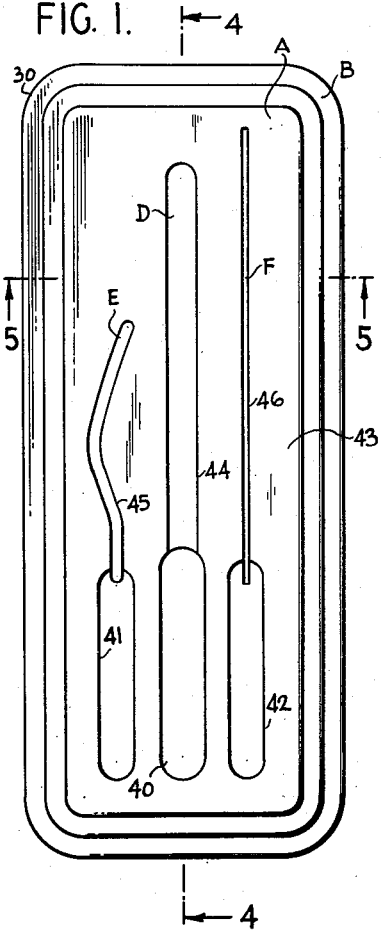
Fig. 1 is a top plan view of the double deck or double tier holder according to the present invention, showing the recesses to receive the carving fork, sharpening steel and roast slicer.
Figure 2:
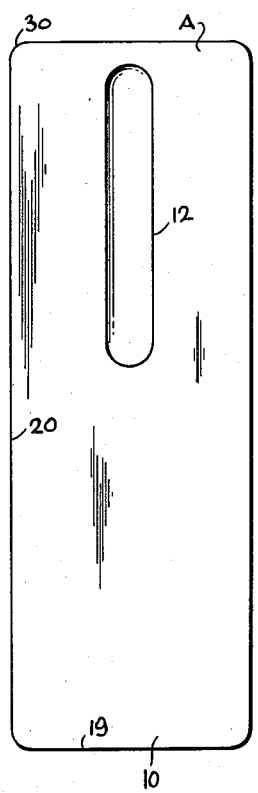
Fig. 2 is a bottom plan view of the removable, upper tier or section, showing the keyway.
Figure 3:
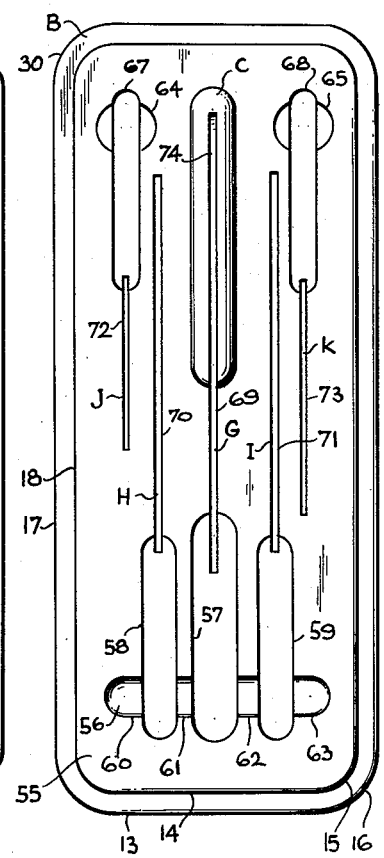
Fig. 3 is a top plan view of the bottom, double stepped section with the section of Fig. 2 removed, showing the recesses for the butcher cleaver, thin slicer, bread slicer, utility knife and paring knife.

Referring to Figs. 1 to 5, the device has an upper section A shown in top view of Fig. 1 and bottom view of Fig. 2, and a double-stepped, lower section B, showing the top view of Fig. 3. These elements are shown keyed together respectively in Figs. 4 and 5 with the key C functioning to maintain them in desired position.

The upper tier or section A is provided with recesses D for a sharpening steel, E for a carving fork and F for a roast slicer. The lower section is provided with recesses G for a butcher cleaver, H for a thin slicer, I for a bread slicer, J for a paring knife, and K for a utility knife.

Figure 4:
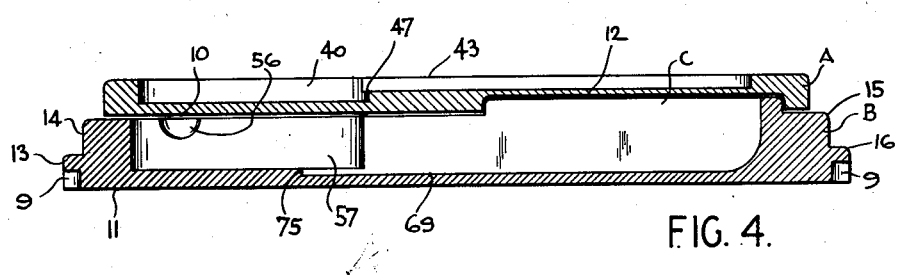
Fig. 4 is a transverse sectional view upon the line 4—4 of Fig. 1, showing the interior construction.
Figure 5:
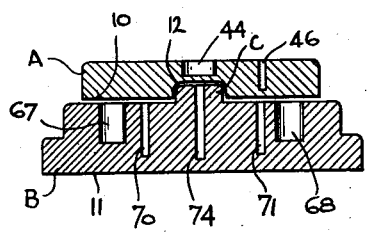
Fig. 5 is a vertical transverse sectional view upon the line 5—5 of Fig. 1.

The bottom of both sections A and B are flat, as indicated at 10 for section A in Fig. 2 and 11 for section B in Figs. 4 and 5, with the exception that the bottom pin of the section A is provided with an elongated recess 12 for receiving the key C, as is shown best in Figs. 4 and 5.

The bottom section B has two levels or sections 15 and 16 which have the end faces 13 and 14 and the side faces 17 and 18 with the faces 14 and 18 being positioned inside of the outer base faces 13 and 17. The upper section A also has the end faces 19 and the side faces 20, which are also spaced inside of the faces 13 and 14 and 17 and 18 by the same distance, so as to give a uniform stepped effect, as best shown in Figs. 1, 4 and 5.

The ends of the face 11 of the base B are provided with the recesses 9 to permit insertion of the hands and lifting of the unit of Figs. 1, 4 and 5 together.

It will be noted that the corners are rounded, as indicated at 30 in Figs. 1 to 3, to give a smoother appearance. The recesses D, E, and F in the top section A are relatively shallow with the portions 40, 41 and 42 serving to receive the handles, which will project substantially above the top surface 43 of the upper section A. These recesses are then continued in the more shallow or deeper recesses 44, 45, and 46, which receive, respectively, the extension of the sharpening steel, the prongs of the carving fork and the knife element of the roast slicer.

As is indicated in Fig. 4, there will be a step-up at 47 from the recess 40 to the recess 44 for the sharpening steel, with the result that both the handle and the steel itself will project above the surface 43.

To the lower section B the various knives and cleavers are substantially completely recessed in the recesses H, I, J and K so that they will not project above the surface 55, and prevent close fitting together of the upper section A and lower section B by the key C. Because of this, it is necessary to provide the transverse groove 56 communicating with the handle recesses 57, 58 and 59 for the handles, respectively, of the butcher cleaver, thin slicer and bread slicer, which handles will be below the surface 55 in said recesses 57, 58 and 59. The transverse groove 56 will permit the fingers to be inserted in the recesses 60, 61, 62 and 63 to remove the various utensils by their handles from the arrangement shown in Fig. 3, and also in section of Figs. 4 and 5.

In connection with the recesses J and K for the utility knife and paring knife, recesses 64 and 65 are also provided transversely of the handle recesses 67 and 68 so that the fingers may be inserted therein to remove the utility knife and paring knife.

The recesses 69, 70, 71, 72 and 73, respectively, receive the blades of the butcher cleaver, thin slicer, bread slicer, utility knife and paring knife, sufficient depth being provided so that they will not project above the surface 55.

The extension 74 of the slot 69 will extend into and through the key C.

It will be noted that in the central recess G there is a step-down at 75 from the handle recess 57 to the blade recess 69.

Normally, the butcher cleaver, thin slicer, bread slicer, utility knife and paring knife will all be assembled in the base section B of Fig. 3. Then the upper section A will be placed in position with the key C fitting in the recess 12 with or without the carving knife, roast slicer and sharpening steel in position.

The unit provided is for dining room and kitchen use and holds these utensils in readily available position and also presents them in such a way that the householder will not cut his or her fingers in using the same. The device is quite sanitary and may be readily cleaned and it also presents the eight utensils carried thereby in a most attractive form.

It is obvious that the same structure may be made elliptical or circular or even of elongated or polygonal shapes. A larger or greater number of recesses for different or more or less utensils than indicated at D to K may be provided and if desired several additional tiers may be employed or eevn only one tier may be provided. In case only one tier is provided, the recesses need not be as deep and the recesses 56, 64 and 65 need not be provided for the fingers. Although widely varying shapes and sizes may be employed, it has been found most satisfactory, according to one embodiment of the present invention, to provide a base with a maximum dimension of 19" to 20" in length and about 7½" in width, with steps averaging ⅞" to 1" in height and ½" in width to give a most attractive appearance. The recesses in the bottom or cover sections then may vary from 1" to 1½" to completely receive the utensils while in the top section the recesses may vary from ⅛" to ⅝" in depth, making certain that the handle will project sufficiently to enable grasping of the knife, cleaver or other utensil.

While there has been herein described a preferred form of the invention, it should be understood that the same may be altered in details and in relative arrangement of parts within the scope of the appended claims.

Having now particularly described and ascertained the nature of the invention, and in what manner the same is to be performed, what is claimed is:

1. A kitchen utensil holder comprising two rectangular elongated wooden blocks, one being a base holder and the other being a top holder, both having elongated recesses on their upper faces for receiving utensils and the base holder having a longitudinal central ridge on its top face and the top holder having a correspondingly shaped recess on its bottom face, said ridge and recess fitting together to hold the blocks together.

2. The holder of claim 1, said ridge having an elongated recess to receive part of a utensil.

References Cited in the file of this patent

UNITED STATES PATENTS

| Number | Name | Date |
| --- | --- | --- |
| Re. 10,132 | Laraway et al. | June 6, 1882 |
| D. 149,540 | Case et al. | May 11, 1948 |
| 261,340 | Gundorph | July 18, 1882 |
| 647,388 | Evans | Apr. 10, 1900 |
| 738,980 | Bradley | Sept. 15, 1903 |
| 1,015,664 | Booth | Jan. 23, 1912 |
| 2,136,916 | Freetag et al. | Nov. 15, 1938 |